United States Patent [19]

Vowles et al.

[11] Patent Number: 5,405,250

[45] Date of Patent: Apr. 11, 1995

[54] WAVE ENERGY EXTRACTION DEVICE

[76] Inventors: Alan Vowles, P.O. Box 914, Flin Flon,.Manitoba, Canada, R8A 1N7; Gerald J. Vowles, 57 Joyce Crescent, Belleville, Ont., Canada, K8N 1Y6; Bruce Vowles, 20 Raitar Avenue #5, Kitchener, Ont., Canada, N2H 6A7

[21] Appl. No.: 968,264

[22] Filed: Oct. 30, 1992

Related U.S. Application Data

[63] Continuation-in-part of Ser. No. 655,155, Feb. 14, 1991, abandoned.

[51] Int. Cl.[6] .............................................. F04B 35/02
[52] U.S. Cl. ..................................... 417/331; 417/332; 60/502; 60/497
[58] Field of Search ............... 417/329, 330, 331, 332, 417/333; 60/497, 502, 506; 290/42, 56

[56] References Cited

U.S. PATENT DOCUMENTS

| | | | |
|---|---|---|---|
| 1,754,025 | 4/1930 | Lawrence | 417/332 |
| 4,139,984 | 2/1979 | Moody et al. | 290/53 |
| 4,172,689 | 10/1979 | Thorsheim | 417/330 |
| 4,291,234 | 9/1981 | Clark | 417/330 |
| 4,560,884 | 12/1985 | Whittecar | 417/330 |
| 4,719,754 | 1/1988 | Nishikawa | 60/497 |

*Primary Examiner*—Richard A. Bertsch
*Assistant Examiner*—Charles G. Freay

[57] ABSTRACT

An apparatus and method for converting the motion of waves on a body of fluid into useable energy. The apparatus includes a floating or fixed rotatable support structure, a lever arm(s) pivotally supported from the support structure, and a wave follower fixed to one end of the lever arm(s) and positioned on the body of fluid. The lever arm is connected to an energy transfer device such as a piston rod which drives a load in response to the action of waves on the wave follower. The wave follower is designed such that the upper portion is constructed of a buoyant substance and the lower portion constructed in the form of a hollow chamber, open at the bottom, with the seaward face being angled so as to harness the energy of the lateral force of the wave. The open bottom of the wave follower allows the chamber to fill with fluid generally on the rise of a wave. When the fluid level drops, a suction is created in the chamber by the closing of a valve located in the upper portion. This action together with surface adhesion restricts fluid from flowing out of the chamber thus causing the wave follower to be pulled down by the weight of the fluid in the chamber. As the wave rises the buoyant upper portion causes the wave follower to rise. Extending seaward, vertical and inclined funnelling panels will funnel the wave inward and upward toward the wave follower thus amplifying the wave height.

40 Claims, 9 Drawing Sheets

WAVE ENERGY EXTRACTION DEVICE

This is a continuation-in-part of application Ser. No. 07/655,155, filed 02/14/91 (Feb. 14, 1991), now abandoned.

BACKGROUND OF THE INVENTION

This invention relates to devices which are designed to extract useable amounts of energy from the action of waves on a body of fluid.

With the ever increasing need to be environmentally conscious more attention is being paid to clean, renewable energy sources.

Numerous designs have been tested and failed to reach commercialization; primarily because they could not compete economically with existing energy sources such as hydro, nuclear power, and fossil fuels.

A further problem plaguing efforts to design a viable wave energy generator is the generator's susceptibility to damage due to extreme weather conditions. This problem is particularly apparent when dealing with designs of relatively large dimensions. Current research has been directed toward developing smaller devices which may be used as a plurality. Smaller devices, however, are less efficient than their larger counterparts and generally the prior art devices which were designed to harness the energy in both the rise and fall of a wave fail to do so efficiently.

SUMMARY OF THE INVENTION

The present invention seeks to provide a relatively economical apparatus for extracting energy from a wave on both the rise and fall of a wave, thus making use of the upward and downward stroke of this device.

In accordance with this invention there is provided a wave follower device for use in an apparatus for converting the motion of waves on a body of fluid to useable energy, said wave follower comprising; a buoyant upper body portion for tracking the rise of said waves, a lower body portion incorporating at least one fluid fillable chamber, said chamber being enclosed on the top and sides, and with a mouth opening on the bottom of said chamber.

Another aspect of the invention incorporates into the wave follower a one-way valve which interconnects the lower body chamber with the environment outside the chamber allowing pressure inside the chamber to be equalized with pressure outside the chamber. This allows fluid to freely enter the chamber on the ascent of a wave. The one-way valve closes when the fluid attempts to flow out of the chamber on the descent of a wave. The flow of fluid through said lower body mouth, generally on the descent of a wave, is restricted due to the suction effect of the partial vacuum within the chamber and the condition of surface adhesion created between the fluid and the roof of the chamber.

A further aspect of the invention includes a flat or convex windward side surface of the wave follower which generally faces oncoming waves, said surface being inclined bottom inward, away from said oncoming waves. The inclined surface converts the kinetic energy in the lateral motion of the waves from a lateral force to a lifting force. The leeward side surface inclined, bottom outward away from oncoming waves to is curved from top to bottom; this curvature forming an arc of a circle centred on the centre point of the axle or fulcrum about which the lever arm pivots, causing a minimum displacement of fluid and therefore little energy transfer between the rear of the wave follower and the fluid.

The invention can also include a funnelling channel designed to increase the amplitude of the waves so as to extend the lower end of the range of wave heights over which energy can be extracted. This funnelling channel comprises substantially vertical sides, inclined bottom and curved rear panel, said rear panel forming an arc of a circle concentric to the arc of the leeward side surface of the wave follower. This channel serves to confine and redirect almost all the available energy to move the wave follower.

Additional aspects of the present invention include the ability of the unit to freely rotate to compensate for wave direction, and the flexibility with regard to methods of mounting the device. For example, the support structure may be designed as a floating raft secured to the earth by means of a damper plate, line, swivel and anchor or the support structure may be solidly attached to a seabed, lakebed or shoreline.

This invention can harness the energy contained in the wave motion over a wide range of wave heights including those measuring only a few centimeters in height depending on the length of the lever arm. With this capability considered the present invention demonstrates its operational versatility. In other words the machine is not limited to use on large bodies of fluid and may be installed on inland lakes, streams and ponds.

The loads which can be driven using the invention are many and varied and are not to be taken as limiting the scope of the invention. For example, a reciprocating pump can be driven which can pump fluid under pressure to power an electrical generator. Electricity can be generated by utilizing the mechanical drive mechanism to power an electrical charging unit to charge a power supply. An alternate method would be to pump fluid through a line to an elevated reservoir for later use to drive a turbine.

The energy extracted from the motion of the wave follower may be utilized for such purposes as the generation of electricity, desalination of salt water, the production of chemicals or the supply of fresh water.

Details of these features and various embodiments will subsequently become apparent when reference is made to the accompanying drawings and descriptive text hereinafter.

DESCRIPTION OF PREFERRED EMBODIMENTS

Figure 1:
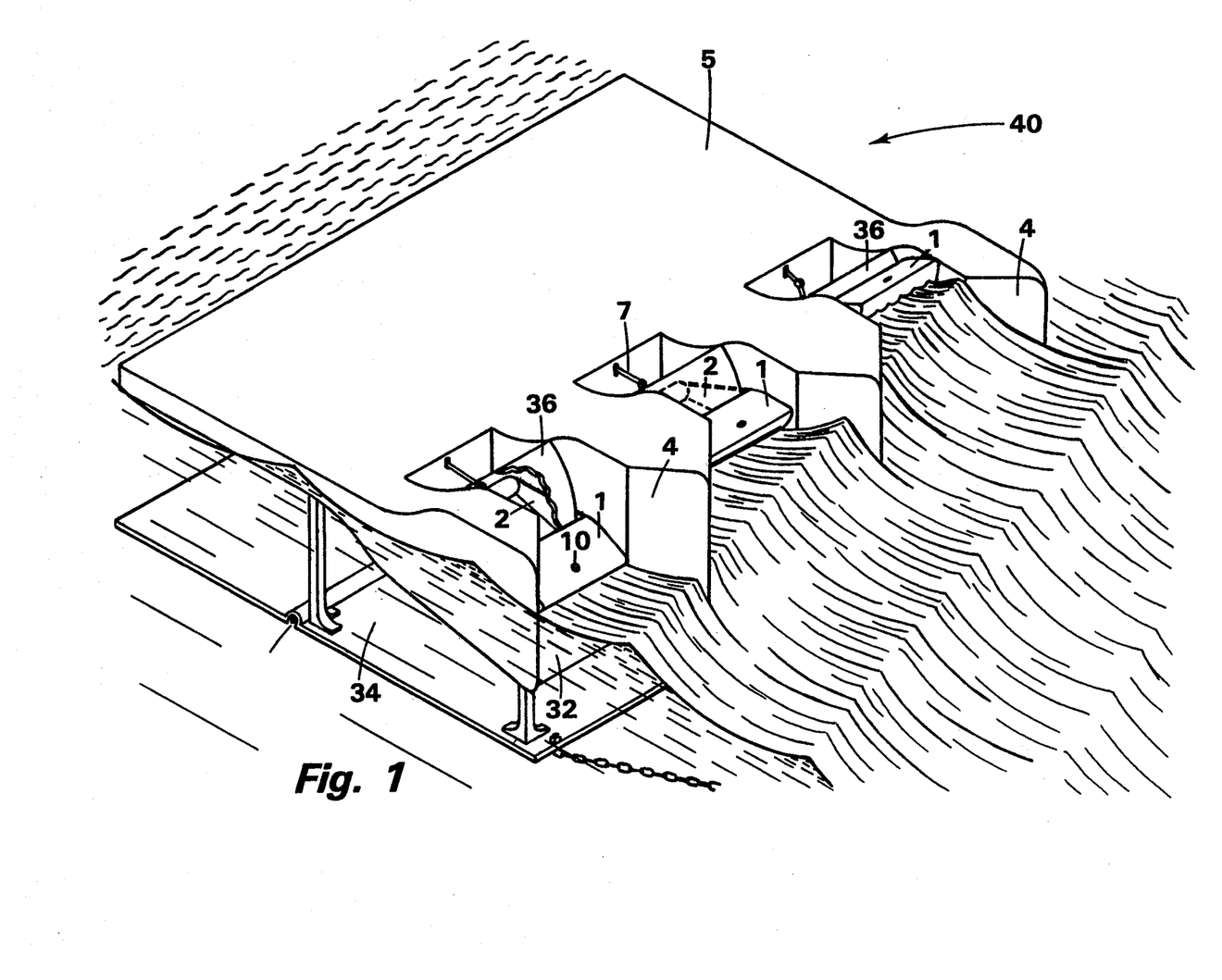
FIG. 1 is an isometric view of the device according to the invention.
Figure 2:
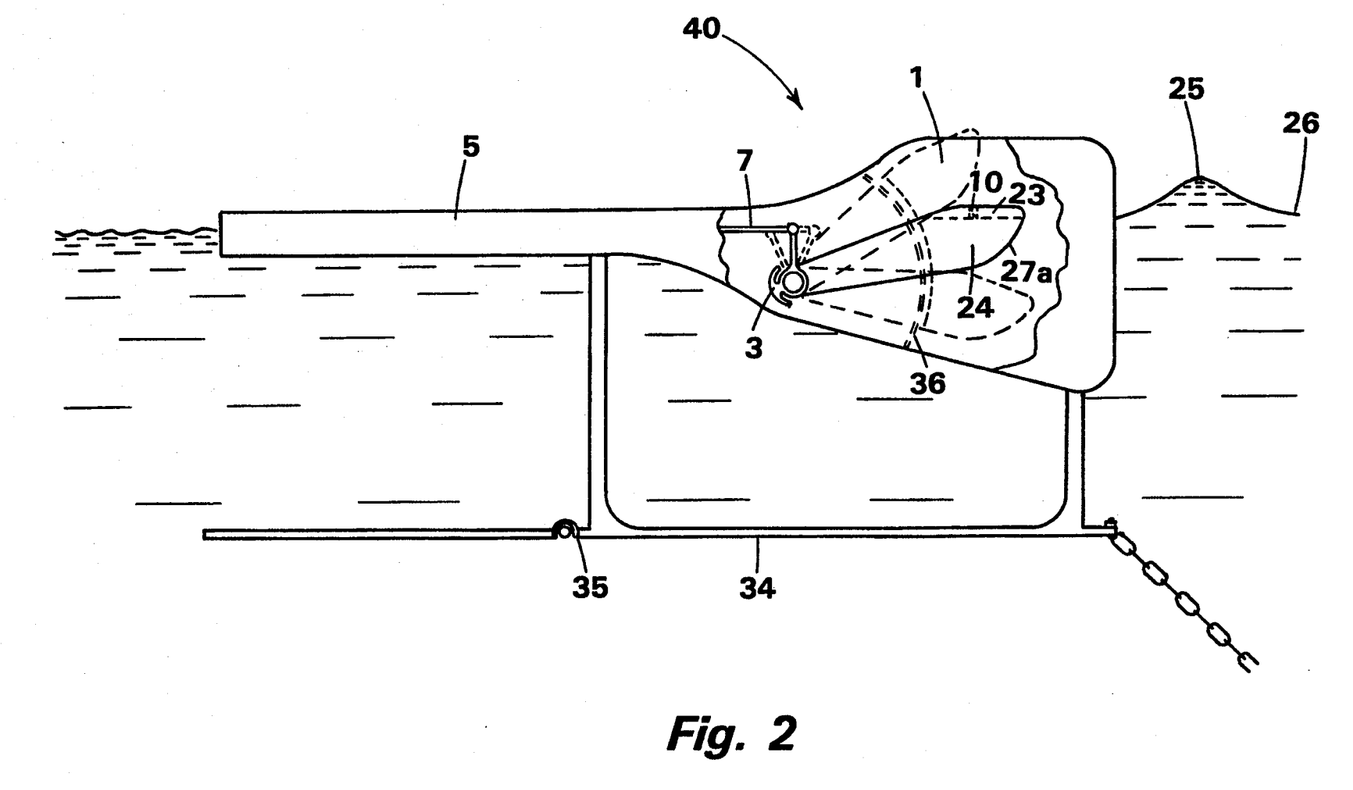
FIG. 2 is a side view of the device shown in FIG. 1.
Figure 3:
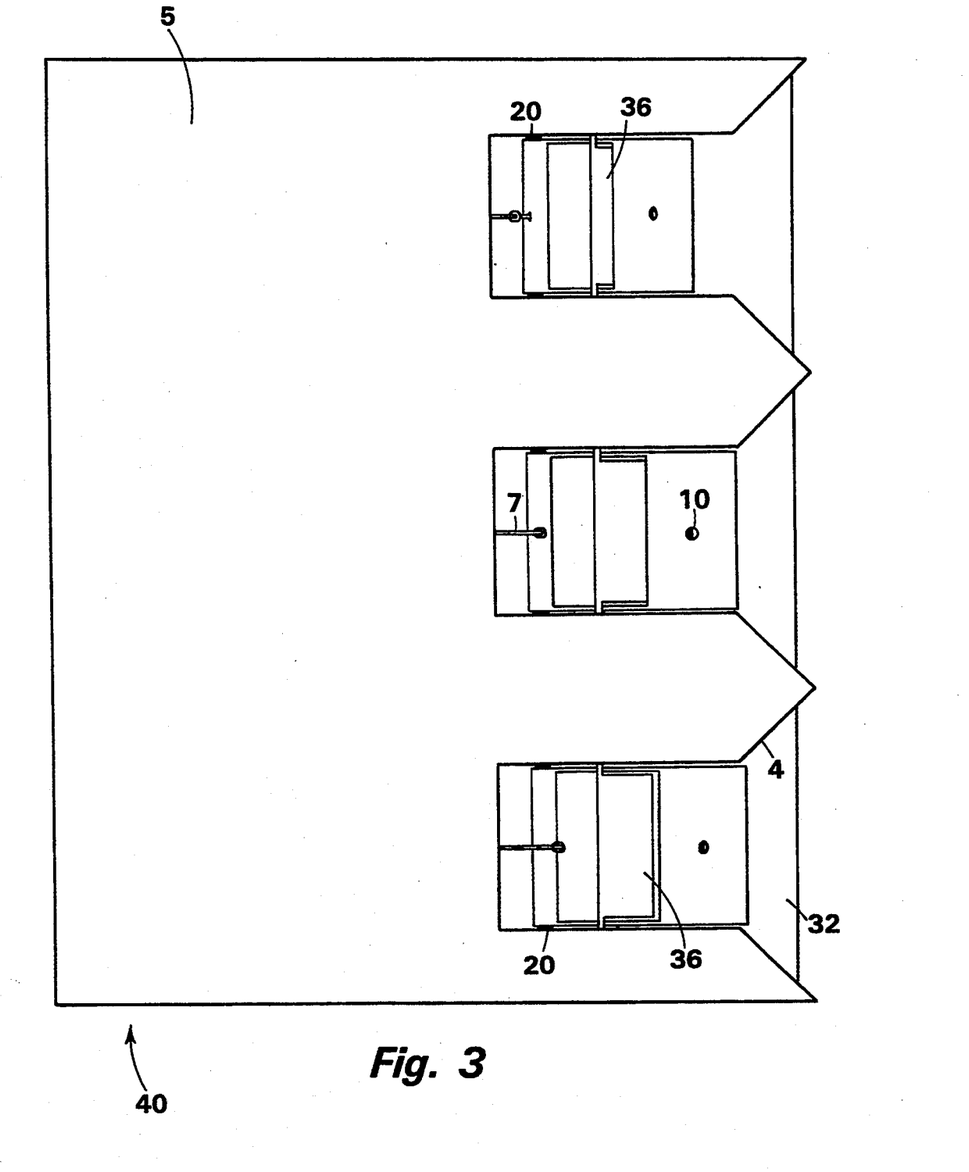
FIG. 3 is a top view of the device shown in FIG. 1.

Referring to FIGS. 1, 2 and 3 a wave energy extraction device is shown generally by numeral 40. The device comprises a support structure 5, a lever arm 2 pivotally supported from the support structure 5, and a wave follower 1 fixed to one end of the lever arm 2 and positioned on the body of fluid. The lever arm 2 is pivotally connected by means of an extension 6 and bearing 11 to a piston rod 7 which drives a load such as a piston of a reciprocating pump (not shown), in response to the upward and downward action of waves on the wave follower 1. The lower end of the support structure 5 is attached to a hinged damper 34 which is rotatably attached to the sea or lake bottom. The waves are funnelled toward the wave follower 1 by means of vertical panels 4 and inclined panel 32, thus amplifying smaller waves to a height great enough to actuate the apparatus. The passage of fluid beneath the wave follower 1 is prevented by a curved panel 36 at the rear of the wave follower 1, said curved panel having a cross-sectional profile radius concentric to the arc of the leeward side surface 27b of the wave follower 1. A detailed description of each of these components follows.

Figure 4A:
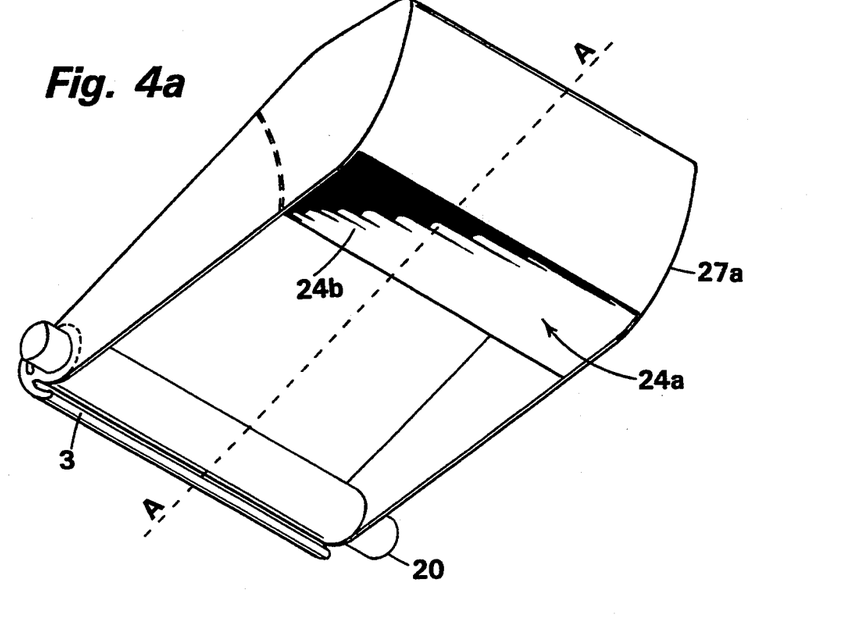
FIG. 4a is an isometric view of one embodiment of the wave follower device according to the invention.
Figure 4B:
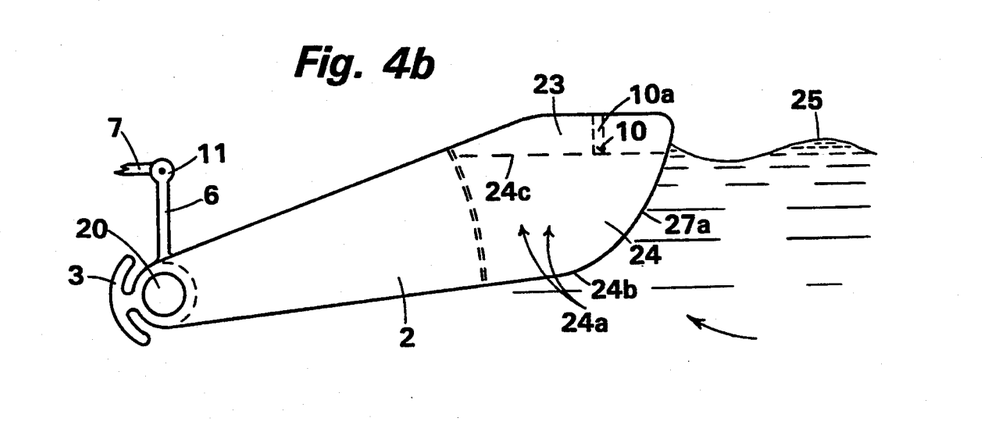
FIG. 4b is a cross sectional view of the device shown in FIG. 4a on line A—A.

Referring to FIG. 4a and 4b the unique wave follower 1 comprises an upper body portion or flotation unit 23 which is made of any suitable buoyant material, a lower body portion 24 constructed in the form of a hollow chamber 24a, having an opening 24b at the bottom, with a side surface 27a being angled bottom inward, so as to harness the energy of the lateral force of the wave, an opposite side surface 27b and a pressure relief valve 10 located in the top or roof 24c of the hollow chamber 24a. The side surface 27b is curved top to bottom forming an arc of a circle centred at the axis or axle 20 about which the lever arm 2 rotates. This shape minimizes the transfer of energy between the leeward side surface 27b and said fluid.

Referring to FIG. 4b, the lower body portion 24 is attached to the underside of the buoyant upper body portion 23, so that when the wave follower 1 is placed in fluid the upper body portion 23 floats on the surface of the fluid, while the lower body 24 remains relatively submerged. The one-way valve 10 is located in a passage 10a in the upper body portion 23, which leads from the interior of the chamber 24a through the upper body portion to the atmosphere.

The operation of the wave follower 1 can be explained also with reference to FIG. 4b. With the absence of waves 25 on the surface of the fluid and with the chamber 24a filled with fluid; the upper portion 23 of the wave follower floats on the fluid and the lower portion 24 is submerged. On the rise of a wave, (an upward stroke with regard to the wave follower), the buoyant material 23 tracks the rise of the wave and since the fluid in the chamber is of the same density as the wave, work is only done in raising the buoyant body. At the same time, the lateral force of the wave, as it contacts the wave follower, is converted by the inclined surface 27a to an upward force aiding the upward movement of the wave follower. If the chamber is not entirely filled with fluid because fluid has escaped during the fall of a wave, (downward stroke with regard to the wave follower), the rise of the next wave causes fluid to enter the chamber through the opening 24b, thereby causing an increase in pressure of the air contained between the fluid and the roof 24c of the chamber. The increase in air pressure causes the one-way valve 10 to open thus exhausting air from the chamber and allowing fluid to freely enter the chamber through the opening 24b.

The fall of the wave starts the downward stroke of the wave follower. As the wave trough is tracked by the wave follower, fluid in the chamber 24a will tend to flow out the opening 24b, thus causing air pressure in the chamber 24a to be reduced. The one-way valve 10 closes due to this drop in pressure, thereby preventing the free outflow of fluid from the chamber 24a. The weight of the fluid in the chamber, the suction effect created, and surface adhesion serve to pull the wave follower down on the downward stroke.

Referring to FIG. 2 the operation can be summarized as follows: As a wave crest 25 approaches, the wave follower 1 is caused to rise by the buoyancy of the upper body portion 23 and by the lateral force of the oncoming wave as it comes in contact with the inclined face 27a. Because the lower body portion 24 is open, it is completely filled with fluid which will naturally rise with the wave crest 25 and fall with the wave trough 26. If the lower body portion 24 should lose any fluid on the downward stroke a one-way valve 10 will permit air to be exhausted and the lower body portion to refill with fluid on the upward stroke. As a wave trough 26 approaches the wave follower 1 is caused to fall by the pull of gravity acting upon the contained fluid in the lower body portion 24 and by the combined forces of suction and surface adhesion. The force of suction is created as the fluid tries to escape from the lower body portion 24. The condition of surface adhesion is created as the fluid attempts to break its bond with the roof 24c of the chamber of the lower body portion 24.

Figure 9:
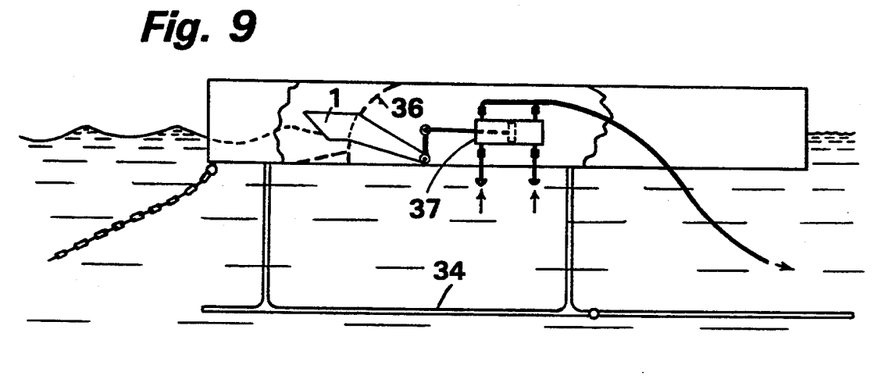
FIGS. 9 and 9a depict two stylized versions of the present invention.
Figure 9A:
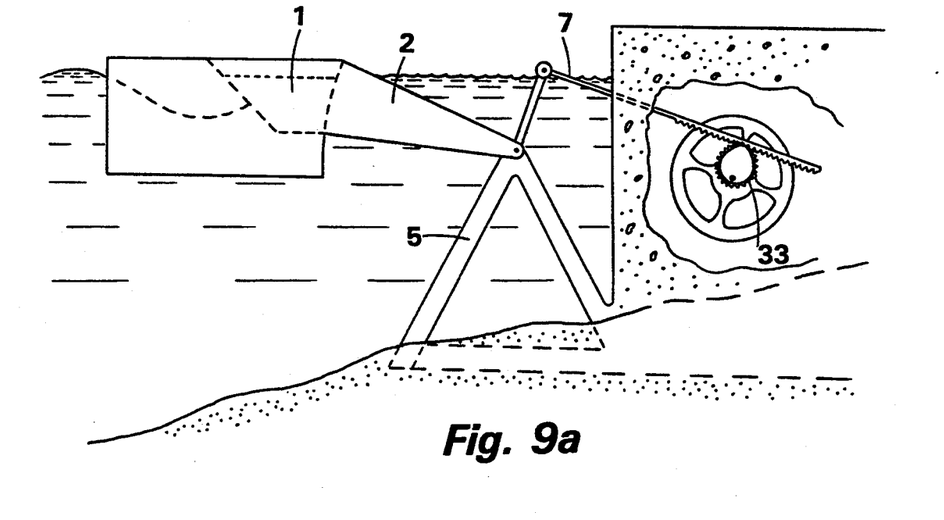

Referring to FIGS. 9 and 9a, the two stylized drawings illustrate two possible configurations of the present invention. FIG. 9 illustrates an embodiment wherein the apparatus is shown as a floating structure 5 which houses a reciprocating pump 37 driven by a wave follower 1 and attached to a draper 34 which is anchored to the sea or lake bottom. FIG. 9a illustrates the utilization of a cam assembly 33 to vary the mechanical advantage with respect to the leverage ratio between the lever arm 2 and the device said lever arm is driving.

Figure 6:
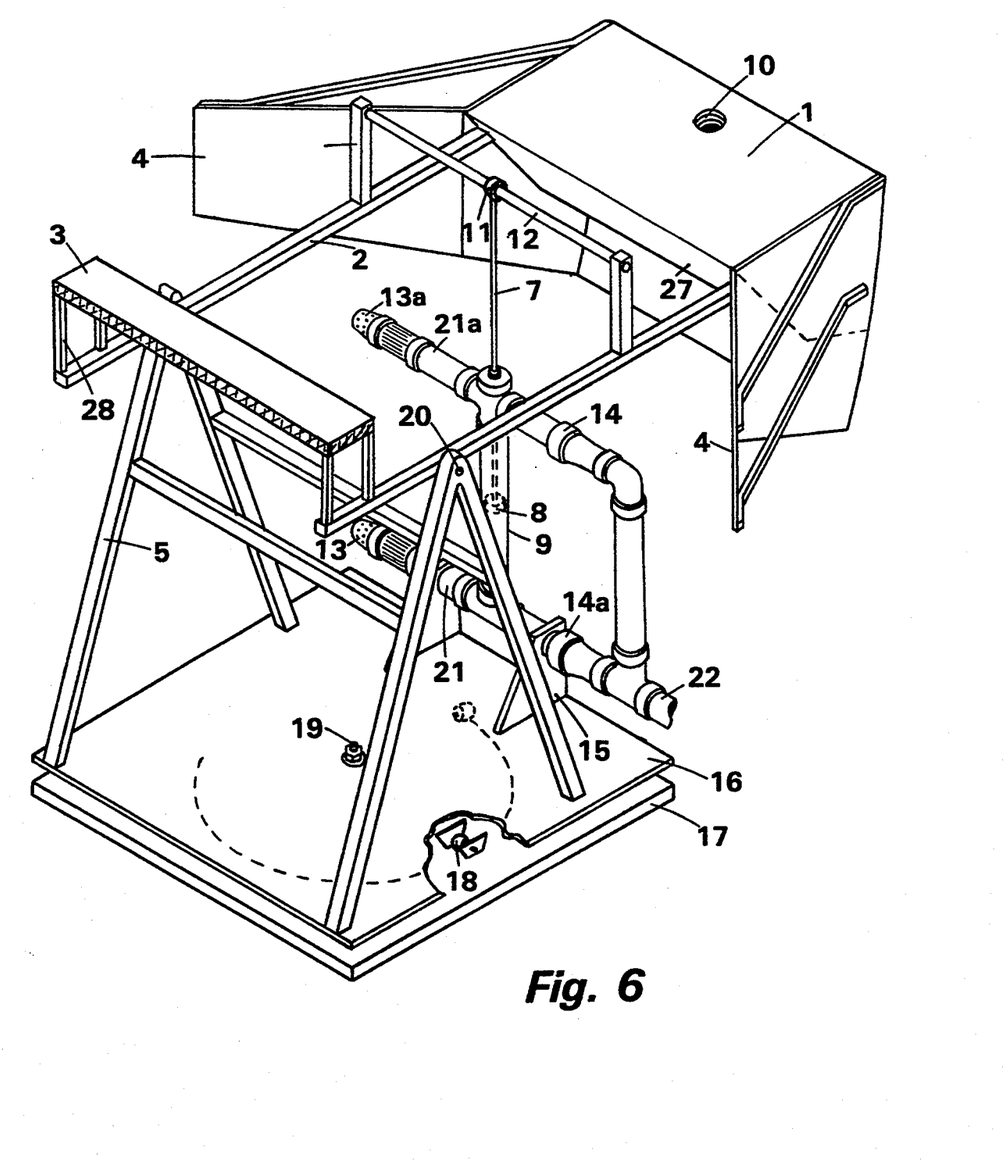
FIG. 6 is an isometric view of a still further embodiment of the invention.
Figure 7:
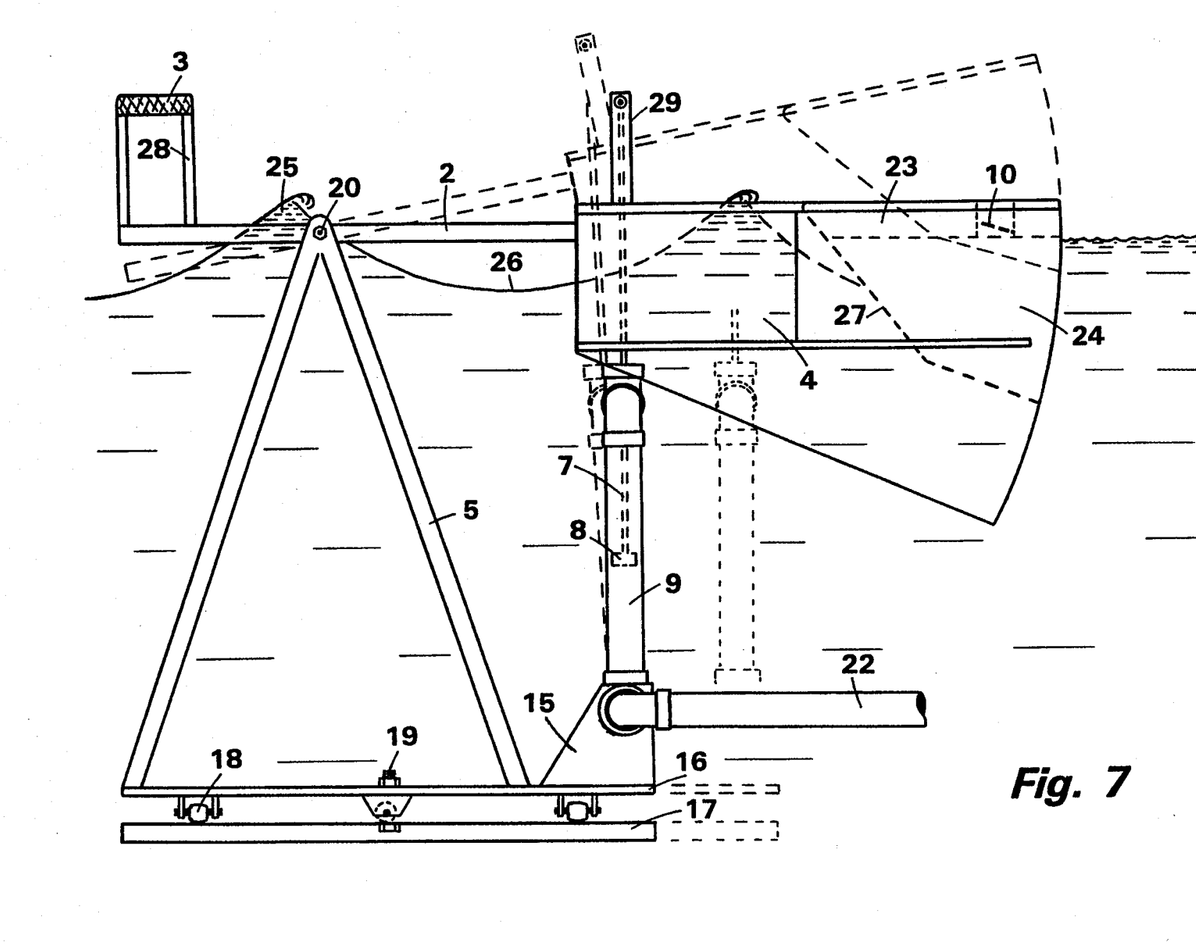
FIG. 7 is a side view of the invention showing the device connected to a drive mechanism.

Referring to FIGS. 6 and 7, the support structure 5 is attached to an upper plate 16 which is rotatably attached to a lower plate 17. The lower plate 17 may be solidly attached to the lake or sea floor or to a structure such as a wharf or breakwater or be secured to a large floating structure. The upper plate 16 is allowed to rotate freely about a swivel pin 19 and rests on rollers 18 which separate the upper plate 16 from the lower plate 17. In another embodiment of the invention the swivel pin 19 and rollers 18 may be substituted by a set of bearings on a single rotating shaft (not shown). The ability of the device to freely rotate enables the wave follower 1 to turn with changing wind or wave direction so as to be positioned to make optimum contact with the oncoming waves.

Figure 8:
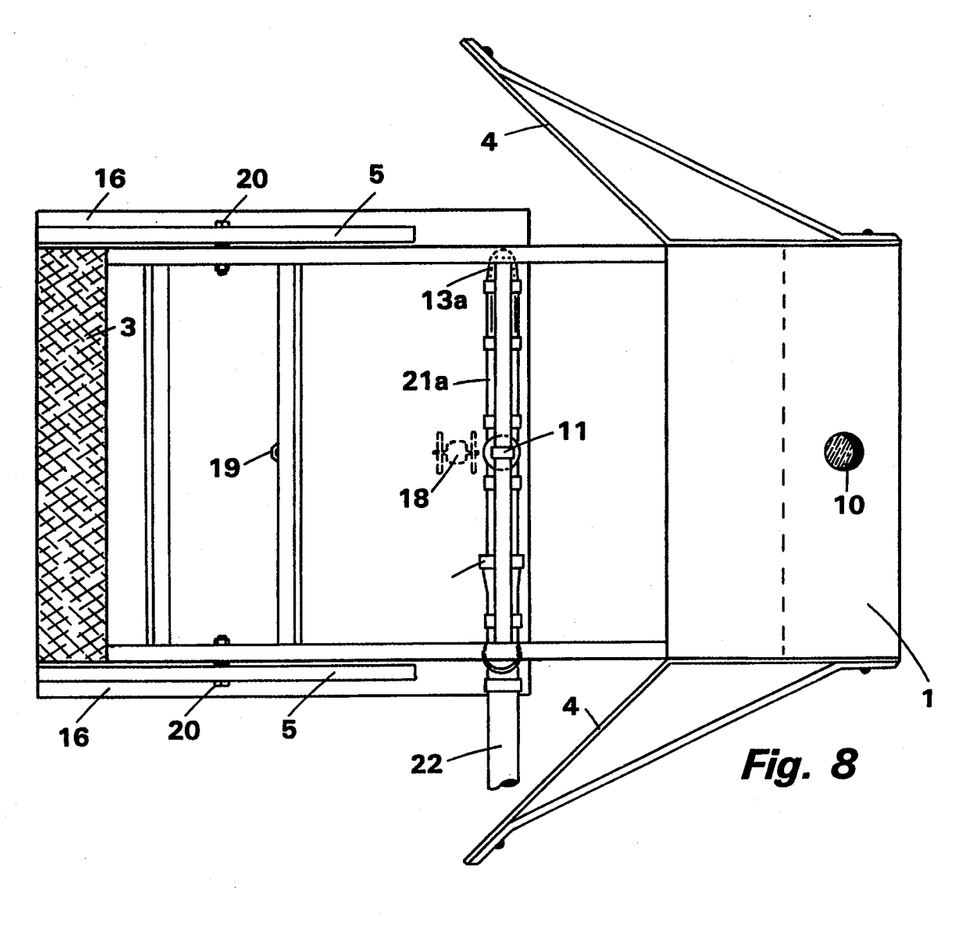
FIG. 8 is a top view of the embodiment shown in FIG. 7.

The wave energy converter assembly 40, as shown in FIGS. 2, 4, 5, 6, 7 and 8 may additionally include a counterweight 3 attached to the opposite end of the lever arm 2 from the wave follower 1. The lever arm 2 is balanced such that the wave follower 1 end is slightly heavier than the end with the counterweight 3. The purpose of the counterweight is to relieve the floatation unit 23 of the need to lift the combined weight of all of the components of the wave follower 1, thereby enabling the floatation unit 23 to accomplish a similar amount of work while being of smaller dimension. In FIGS. 6, 7 and 8 the counterweight 3 and the pivot bar 12 are shown to be elevated on extensions indicated by numerals 28 and 29, respectively. The purpose of the extensions 28 and 29 is to elevate the pivot bar 12 and the counterweight 3 to a height greater than that of the crest of a wave 25 as indicated in FIG. 7, so as not to obstruct the path of the wave. By utilizing a counterweight to balance the device such that the combined weight of the components on the wave follower side of the fulcrum 20 is slightly greater than the weight of the components on the counterweight 3 side, the wave follower becomes sensitive to very small waves.

When the sensitivity due to the counterweight 3 combined with the increased wave amplitude due to the funnelling panels 4 and a greatly increased wave frequency are all considered during periods of small wave action it becomes apparent that the device is able to maintain operational capability throughout a wide range of wave heights.

The conversion of wave motion to useable energy is accomplished by attaching a drive shaft 7 to the lever arm 2, thus with the upward and downward movement of the wave follower 1 the reciprocal action of the drive shaft 7 may be utilized to power a load or a driven device.

Illustrated in FIGS. 6, 7 and 8 is an embodiment of the invention in which the drive shaft 7 is utilized as a piston rod to drive a reciprocating pump. The reciprocating pump is comprised of a piston rod 7, sleeve bearing 11, piston 8, cylinder 9, foot valves 13, 13a, check valves 14, 14a, intakes 21, 21a, outlet 22 and various plumbing fittings which will not be numerically identified. The pump assembly rests on supports 15 which allow the pump to rock backward and forward in order to maintain alignment with the piston rod 7. The piston rod 7 is attached to the pivot bar 12 by means of a sleeve bearing 11 which allows the pivot bar 12 to rotate within the sleeve bearing 11 as the lever arms 2 move upward and downward. The ability of the piston rod 7 to rotate about the pivot bar 12 and the pump to rock backward and forward within the pump supports 15 enables the vertical axis of the piston 8 to be properly aligned with the vertical axis of the inner walls of the cylinder 9 at all times. As the wave follower 1 rises so does the piston 8 within the cylinder 9 creating a suction within the cylinder 9 below the piston 8. This action causes fluid to be pulled into this lower part of the cylinder 9 through the inlet 21 by opening the foot valve 13. The fluid previously contained within the upper part of the cylinder 9 above the piston 8 is pressurized as the piston 8 rises and reduces the volumetric capacity in this upper part of the cylinder 9. This fluid in the upper part of the cylinder 9 is then expelled through the outlet 22 passing through the check valve 14a. As the wave follower 1 travels downward so does the piston 8 reversing the action within the cylinder 9 creating a suction within the cylinder 9 above the piston 8. This action causes water to be pulled into this upper part of the cylinder 9 through the inlet 21a by opening the foot valve 13a. The fluid previously contained within the lower part of the cylinder 9 below the piston 8 is pressurized as the piston 8 is forced downward and reduces the volumetric capacity in this lower part of the cylinder 9. This fluid in the lower part of the cylinder 9 is then expelled through the outlet 22 passing through the check valve 14a. The expelled, pressurized fluid may then be utilized to power a battery charging system or any piece of machinery which may be suitably adapted. As aforementioned this same pressurized fluid may be used simply as a means for a water supply or may be pumped to an elevated reservoir for later use in driving a turbine for the generation of electricity. As the fluid is pressurized through the motion of the piston 8 within the cylinder 9 the piston rod 7 must have sealable entry to the cylinder 9 which is accomplished through the use of an annular seal at the upper end of the cylinder 9.

Figure 5:
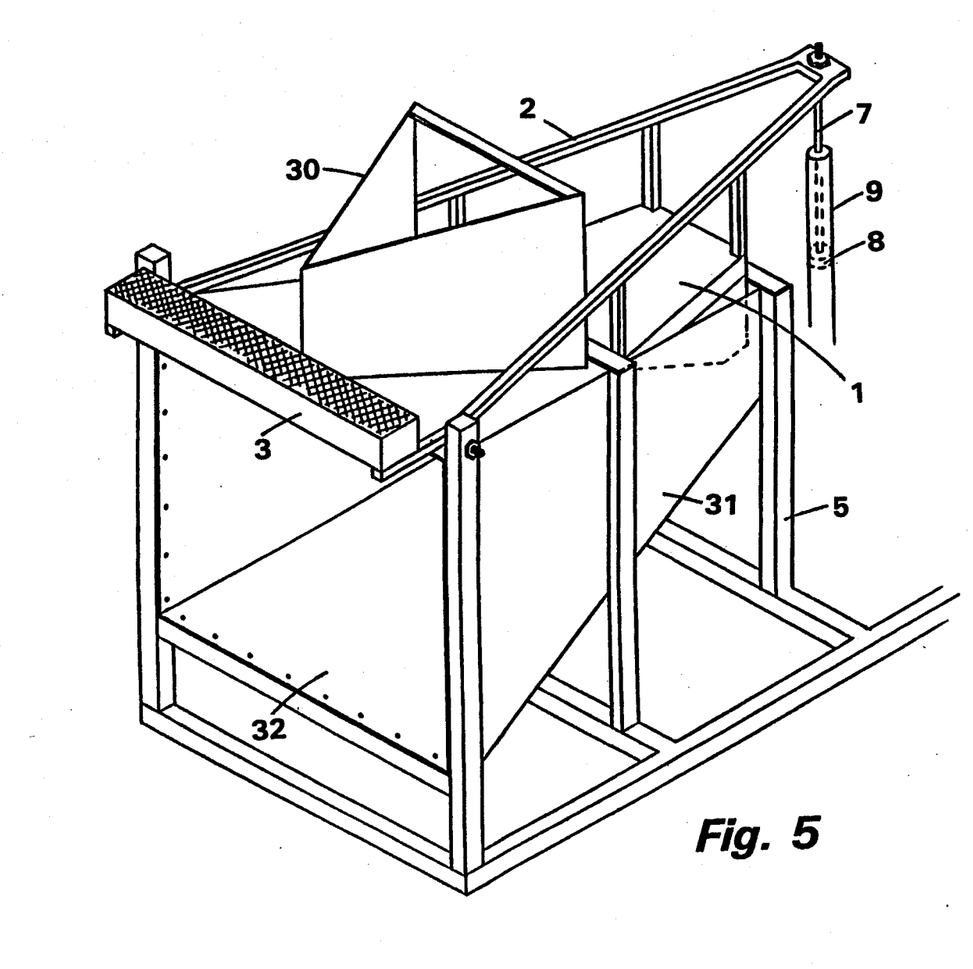
FIG. 5 is an isometric view of a further embodiment of the invention.

In FIG. 5 is shown another embodiment of the present invention in a different configuration and design. In this embodiment a wave channel comprised of two channel walls 31, a channel ramp 32 and a crest shearing structure 30 is solidly affixed to the support structure 5. The purpose of the wave channel is to amplify a small wave to a greater height as did the funnelling panels 4 in the previous embodiment shown in FIG. 1. In this configuration the piston rod 7 is situated at a more distant point along the lever arm 2 than is the wave follower 1. This arrangement creates a mechanical disadvantage with regard to the ratio of pressure exerted on the wave follower 1 and the pressure exerted on the piston 8 (assuming the areas of the faces of the wave follower 1 and piston 8 were the same). This mechanical disadvantage may provide another advantage by increasing the length of stroke of the piston 8 in the cylinder 9 thereby increasing the sensitivity of the apparatus when operating in very small waves, i.e. a small wave which causes only a ½ inch movement of the wave follower 1 may be amplified to a 1 inch movement of the piston 8 thereby actuating the device. Although no provision for changes in wind or wave direction is shown in this embodiment, this design may be incorporated into a rotatable floating or fixed support structure.

The design of the embodiment shown in FIGS. 6, 7 and 8 indicate swivel pin 19 to be located closer to the leeward end of the machine than to the windward end of the machine. This arrangement will cause the entire device to rotate with changes in wave direction always keeping the wave follower angled face 27a facing windward.

All of the above embodiments are intended for use singularly or as a plurality. Several smaller energy extraction devices can be used to extract a cumulative amount of energy that would require a much larger device if only one device were used. A single large device would be more costly and more difficult to build and maintain in operation.

In all embodiments of the invention the energy transmitted to a driven device via the reciprocal movement of the drive shaft is done so with the incorporation of a cam assembly 33 as shown in FIG. 9a. The cam assembly is utilized to maximize the harvested energy by varying the mechanical advantage of the lever arm in accordance with the relative position of the lever arm to the driven device.

In another embodiment the wave follower may be attached to any vertically mounted post (not shown) by means of a sleeve assembly.

In all of the embodiments of the present invention the wave follower may be designed to break free of the support structure during severe weather conditions. The wave follower will be recoverable due to a cable connecting it to a secure part of the support structure or driven device and may be reattached during normal weather conditions.

In FIGS. 1 and 2 the support structure 5 is shown mounted on a submersed damper plate 34 which flexes on a spring-loaded hinge 35. The damper plate 34 serves to stabilize the support structure 5 against the rocking motion caused by the waves. The hinge 35 enables the damper 34 to bend when extreme forces are applied such as when very high waves strike the device 40. In this embodiment the device 40 is moored by employing a catenary system comprising an anchor line attached between the windward side of the damper plate 34 and a swivelling anchor on the sea or lake floor.

It will be appreciated that the foregoing description of the invention is not intended to limit the scope of the invention, and that other variations and modifications will be obvious to one skilled in the art.

The embodiments of the invention is which an exclusive property or privilege is claimed are defined as follows:

1. A wave follower for use in an apparatus for converting the motion of waves on a body of fluid to useable energy, said wave follower comprising:
a buoyant upper body portion for tracking the rise of said waves and a lower body portion for tracking the fall of said waves, said lower body portion incorporating at least one fluid fillable chamber for trapping and holding static a volume of fluid, said chamber being enclosed on the top and sides, and with a mouth opening on the bottom of said wave follower.

2. A device as defined in claim 1 wherein said lower body portion of said wave follower is submerged in said fluid.

3. A device as defined in claim 2 wherein said lower body portion of said wave follower allows fluid to enter said chamber with the ascent of said waves.

4. A device as defined in claim 3 wherein said wave follower embodies a one-way valve means between said lower body and the atmosphere above said fluid, allowing pressure to be equalized in said chamber with the pressure outside of said chamber, thereby allowing fluid to freely enter said chamber through said opening on the ascent of said waves.

5. A device as defined in claim 4 wherein said one-way valve means closes when the pressure in said chamber equals or attempts to fall below that pressure outside said chamber, thereby restricting the release, through said opening, of said fluid occupying said chamber, on the fall of said waves.

6. A device as defined in claim 5 wherein said one-way valve means allows said fluid to completely fill said lower body chamber of said wave follower, allowing said fluid to come in full contact with the top, inside surface of said lower body portion chamber establishing a condition of surface adhesion.

7. A device as defined in claim 6 wherein said wave follower means embodies a windward side surface generally facing said oncoming waves, said side surface being inclined, bottom inward, away from said oncoming waves, to convert the kinetic energy of the lateral movement of said waves from a lateral force to a lifting force.

8. A device as defined in claim 7 wherein said wave follower means is attached to an end of a rotatable reciprocating drive shaft, said drive shaft being an integral part of any driven device deemed stationary with respect to the up and down motion of said wave follower means.

9. A device as defined in claim 7 wherein said wave follower means includes funnelling panels means substantially perpendicular to the surface of said fluid, and diverging diagonally outward of and on the windward side of said wave follower means, said funnelling panels means being immovably affixed to each end of said wave follower means, thereby increasing the amplitude of said waves.

10. A device as defined in claim 7 wherein said wave follower means includes funnelling panels means perpendicular to the surface of said fluid, and diverging diagonally outward of said wave follower means, said funnelling panels means being immovably affixed to a rotatable support means, said rotatable support means being rotatably affixed to said driven device such that said funnelling panel means rests between said oncoming waves and said wave follower, thereby increasing the amplitude of said waves.

11. A device as defined in claim 10 wherein said funnelling panels means includes an inclined panel, said inclined panel being below the surface of said fluid and affixed to said funnelling panels means on an angle so as to redirect a below surface portion of said oncoming waves upward towards said wave follower means, thereby further increasing the amplitude of said oncoming waves.

12. A device as defined in claim 7 wherein said wave follower means is employed as a plurality of same said device, and interconnected to multiply the total useable amount of energy extracted from said waves.

13. Apparatus for converting the motion of waves on a body of fluid to useable energy comprising:
rotatable support means having an upper and lower end, said support means floating in said body of fluid;
lever arm means pivotally supported at one end of said support means;
wave follower means for tracking the surface of said body of fluid and secured to one end of said arm means, said wave follower means having an upper body portion for lifting said arm means on a rise of said wave and a lower body portion for pulling down said arm means on a fall of said wave;
drive mechanism means actuated by the reciprocal movement of said arm means.

14. A device as defined in claim 13 wherein said wave follower means includes funnelling panels means substantially perpendicular to the surface of said fluid, and diverging diagonally outward of and on the windward side of said wave follower means, said funnelling panels means being immovably affixed to each end of said wave follower means, thereby increasing the amplitude of said waves .

15. A device as defined in claim 14 wherein said funnelling panels means includes an inclined panel, said inclined panel being below the surface of said fluid and affixed to said funnelling panels means on an angle so as to redirect a below surface portion of said oncoming waves upward towards said wave follower means, thereby further increasing the amplitude of said oncoming waves.

16. A device as defined in claim 13 wherein said wave follower means includes funnelling panels means substantially perpendicular to the surface of said fluid and diverging diagonally outward of, and on the windward side of said wave follower means, said funnelling panels means being immovably affixed to said rotatable support means, the end of said funnelling panels means closest to said wave follower means being positioned behind each end of said wave follower means, thereby increasing the amplitude of said waves.

17. A device as defined in claim 16 wherein said funnelling panels means includes an inclined panel, said inclined panel being below the surface of said fluid and affixed to said funnelling panels means on an angle so as to redirect a below surface portion of said oncoming waves upward towards said wave follower means, thereby further increasing the amplitude of said oncoming waves.

18. A device as defined in claim 17 wherein said wave follower means has a leeward side surface having a vertical cross-sectional contour of semi-circular shape which has a radius measured from the axis about which said wave follower means revolves, so that when said wave follower oscillates there is a minimum displacement of fluid at the rear of said wave follower and therefore little energy transfer between said leeward side surface and said fluid.

19. A device as defined in claim 18 wherein said support structure has a semi-circular panel situated adjacent and concentric to and on the leeward of said leeward side surface of said wave follower means, thus preventing the passage of fluid beneath said wave follower means.

20. A device as defined in claim 19 wherein said support structure is stabilized against the rocking motion caused by said waves by being solidly attached to a substantially horizontal damper plate which is submerged a minimum depth of twice the length of said lever arm means and is moored by means of a catenary line attached between the windward side of said damper plate and a swivel equipped anchor.

21. A device as defined in claim 20 wherein said damper plate is comprised of two sections joined by a spring-loaded hinge running parallel to said waves, said hinge allowing said damper plate to bend when extreme forces are applied as would be the case when very high waves encounter said apparatus.

22. A device as defined in claim 13 wherein a counterweight means is affixed at an opposite end of said lever arm means from said wave follower means to balance the weights on either end of said lever arm means.

23. A device as defined in claim 13 wherein a wave crest shearing means is immovably attached to said rotatable support means, said shearing means incorporating curved or straight, vertically mounted deflector faces to deflect that part of the wave which has been sheared in a direction that will prevent it from falling onto the top surface of the wave follower.

24. A device as defined in claim 13 wherein a wave crest shearing means is immovably affixed to a rotatable support means, said rotatable support means being rotatably affixed to said driven device such that said crest shearing means rests between said oncoming waves and said wave follower, said shearing means incorporating curved or straight, vertically mounted deflector faces to deflect that part of the wave which has been sheared in a direction that will prevent it from falling onto the upper surface of the wave follower.

25. A device as defined in claim 13 wherein said lever arm means transmits energy to said driven device means through a cam assembly means, said cam assembly means maximizing the harvested energy by varying the mechanical advantage of said lever arm means in accordance with the relative position of said lever arm means to said driven device means.

26. An apparatus to follow the motion of a wave on a body of fluid comprising:
first means for providing buoyancy to follow the ascending motion of the waves;
second means having a fluid filled chamber with a mouth opening in the direction of the descent of the wave to follow the descending motion of the wave; and
a third means to permit suction between the fluid in said chamber and part of the inner surface of said chamber to aid in the restriction of the flow of fluid from the chamber when following the descending motion of the wave.

27. The apparatus of claim 26 wherein the third means is a one-way valve which permits the escape of air from the chamber under the pressure of incoming fluid.

28. The apparatus of claim 26 wherein the second means has a surface generally facing an oncoming wave and inclined to convert kinetic energy of the lateral movement of said wave from a lateral force to an upward force.

29. A device comprised of a plurality of devices as defined in claim 26 interconnected to multiply the total useable amounts of energy.

30. A wave follower device to follow the motion of a wave on a body of water comprising:
an upper body portion of a buoyant material;
a lower body portion having a water fillable compartment with a closed upper end and an open lower end;
a one-way valve in said upper end of said compartment to allow air to be exhausted from said compartment as it fills with water; and
an inclined surface to convert kinetic energy of the lateral movement of an oncoming wave from a lateral force to an upward force.

31. Apparatus for converting the motion of waves on a body of water to useable energy comprising:
floating or fixed support means;
arm means pivotally supported from said support means;
wave follower means for tracking the surface of said body of water and secured to one end of said arm means, said wave follower means having an upper body portion for lifting said arm means on a rise of said wave and a lower body portion for pulling down said arm means on a fall of said wave;
counterweight means secured to an opposite end of said arm means and;
drive mechanism means actuated by the reciprocal movement of said arm means.

32. A device as defined in claim 31 said upper body portion of said wave follower means being a buoyant material.

33. A device as defined in claim 32 said lower body portion having a compartment closed at an upper end and open at a lower end.

34. A device as defined in claim 33 said wave follower means having a surface generally facing an oncoming wave and inclined to convert kinetic energy of the lateral movement of said wave from a lateral force to an upward force.

35. A device as defined in claim 33 said upper portion having a one-way valve positioned in said upper body portion and interconnected with said compartment, said one-way valve being closed as said wave follower falls with the descent of said wave and said one-way valve being allowed to open as said wave follower rises with the ascent of said wave, permitting said compartment to fill with water.

36. A device as defined in claim 31 including wave deflectors secured at the windward side of said wave follower so as to channel said wave inward and upward toward said wave follower, thereby increasing the amplitude of said wave.

37. A device as defined in claim 31 wherein said drive mechanism means drives a reciprocating pump comprising a cylinder, a piston connected to said drive mechanism means, an inlet valve and an outlet valve.

38. A device as defined in claim 37 wherein the output from the reciprocating pump is used to drive an electrical charging system for the charging of rechargeable batteries.

39. A device as defined in claim 31 wherein said drive mechanism means is utilized to mechanically drive an electrical charging system for the charging of rechargeable batteries.

40. Apparatus for converting the motion of waves on a body of fluid to useable energy comprising:

rotatable support means having an upper and lower end, said support means being solidly attached to earth;

lever arm means pivotally supported at one end of said support means;

wave follower means for tracking the surface of said body of fluid and secured to one end of said arm means, said wave follower means having an upper body portion for lifting said arm means on a rise of said wave and a lower body portion for pulling down said arm means on a fall of said wave;

drive mechanism means actuated by the reciprocal movement of said arm means.

* * * * *